United States Patent

Goins, Jr. et al.

[15] 3,675,717

[45] July 11, 1972

[54] METHOD OF GRAVEL PACKING WELLS

[72] Inventors: William C. Goins, Jr.; Bruce B. McGlothlin, both of Houston, Tex.

[73] Assignee: Gulf Research & Development Company

[22] Filed: Jan. 13, 1971

[21] Appl. No.: 106,238

[52] U.S. Cl............................................................166/278
[51] Int. Cl.........................................................E21b 43/04
[58] Field of Search......................166/278, 281, 308; 175/65

[56] References Cited

UNITED STATES PATENTS

| | | | |
|---|---|---|---|
| 2,285,291 | 6/1942 | Larson | 166/278 |
| 2,955,653 | 10/1960 | Cain | 166/278 |
| 3,353,599 | 11/1967 | Swift | 166/278 |
| 3,498,380 | 3/1970 | Sparlin | 166/278 |

*Primary Examiner*—Robert L. Wolfe
*Attorney*—Meyer Neishloss, Deane E. Keith and Paul L. Tillson

[57] ABSTRACT

A method of gravel packing a well in an overpressured formation in which a gravel-carrying liquid is formed by mixing finely divided solid particles of a weighting agent with the liquid. The weighting agent is either soluble in, or can be made soluble by, a liquid that has no appreciable effect on the gravel. Gravel is suspended in the mixture of gravel-carrying liquid and weighting agent and the resultant suspension used in conventional techniques for forming gravel packs. After formation of the gravel pack, a liquid is passed through the gravel pack to dissolve the weighting agent and remove it from the gravel pack. Calcium carbonate and iron oxide are two of the preferred weighting agents that can be used. Hydrochloric acid is a preferred liquid for removal of those weighting agents from the gravel pack.

11 Claims, No Drawings

METHOD OF GRAVEL PACKING WELLS

This invention relates to the production of reservoir fluids from underground incompetent reservoirs penetrated by a well, and more particularly to a method of gravel packing wells in incompetent formations subjected to abnormally high pressures.

Many subsurface formations in which oil and gas are present in substantial quantities are unconsolidated or only poorly consolidated, and are referred to as incompetent formations. Typical incompetent formations exist in California and in the Gulf Coast area. When fluids are produced from such formations, sand from the formation flows into the well where it may cause severe erosion of well equipment and/or plug the well and require expensive workover of the well. Continued movement of formation sands into the well sometimes removes support for formations overlying the incompetent formation with a resultant collapse of the overlying formations and severe damage to the well.

A number of techniques have been used in an effort to overcome the difficulties caused by incompetent formations. Attempts have been made to consolidate the incompetent formations by displacing cementing materials such as organic resins into the incompetent formation to bond the formation particles together. Ordinarily those methods substantially reduce the flow capacity of the formation. Moreover, because organic resins are used, the cost of that consolidating operation is high. Another disadvantage in such processes is that it is difficult to obtain strong and effective adhesion between the binder and the formation particles because of the coating of oil and/or water on those particles. Also it is often difficult to treat all of the perforations that are producing sand with the resins, and often a number of perforations accept little or no resin. Then when these wells are put back on production, sand is produced from the untreated perforations.

Another technique that has been widely used in an attempt to prevent flow of sand into wells is to install a slotted liner or screen in the well and cause fluids produced by the well to flow through the screen. Slotted liners or screens alone are sometimes not effective. If the openings in the liner or screen are small enough to prevent movement of sand into the well, those openings may quickly become plugged with sand particles.

Still another technique used to prevent flow of formation sands into a well is gravel packing. The space between slotted liner or screen and the borehole wall is packed with gravel particles larger than the formation particles but small enough so that the voids between the gravel particles are too small for the formation particles to pass through them. A number of different techniques have been used to form gravel packs. In general, they involve suspending gravel in a liquid, pumping the suspension down the well, and separating the gravel from the liquid at the bottom of the well by a settling or screening technique.

Many of the incompetent formations, particularly in the Gulf Coast area, are overpressured. The term "overpressured" is here used to designate pressures exceeding the pressure exerted by a column of 1.07 specific gravity brine having a height equal to the depth of the well. Many of these overpressured formations can be controlled with sodium chloride or calcium chloride brines. However, when a liquid with a density above 11.8 ppg (saturated calcium chloride) is required, there is no satisfactory liquid available. Mixtures of calcium chloride and zinc chloride will provide the densities, but they are not satisfactory from the economic, corrosion and safety-of-handling standpoints. The only other liquids available are drilling liquids containing insoluble weighting materials and clays for suspension, and these plug gravel packs. Since gravel packing operations may be conducted after the drilling rig has been moved from the well, the pressure control equipment available at a well during drilling may not be available during the gravel packing operation. This invention has as an object the elimination of the dangers of blowouts that exist during the gravel packing of wells in overpressured formations.

This invention resides in a method of gravel packing overpressured formations in which gravel is suspended in a gravel packing liquid formed by suspending in a base liquid finely divided solid material, referred to as a weighting agent, that can be removed from the gravel pack by reaction to form a soluble material or by dissolution. The effective specific gravity of the gravel packing liquid is high enough that the hydrostatic pressure created in the borehole by the suspension is at least as high as, and preferably exceeds, the fluid pressure in the overpressured formation. The gravel pack is formed by conventional methods. After placement of the gravel at the desired location, a liquid capable of removing the finely divided solids by dissolution or chemical reaction is passed through the gravel pack to produce a gravel pack of high flow capacity. The solid particles of weighting agent allow the density of the gravel packing liquid to be increased far above the density of solutions of readily available chemicals.

The well to be gravel packed by this invention can be drilled into or through the incompetent formation by conventional drilling operations. The well may be drilled and cased through the entire incompetent formation, and the casing perforated to permit the flow of formation fluids into the well. Frequently it will be desirable to set casing only into the lower portion of the formation immediately above the incompetent formation and to drill the borehole into and/or through the incompetent formation which is then underreamed to increase the size of the borehole to provide space for gravel packing. The particular method of drilling and the casing arrangement are not a part of this invention. The well may be put on production and the gravel packing of this invention performed later as a workover operation, or the gravel packing may be performed on completion of the well.

Before gravel packing, the well is filled with a liquid such as a drilling mud of high enough density to overcome the formation pressure. Conventional weighting agents such as barite can be used to provide the required density because that weighting agent will be displaced from the vicinity of the incompetent formation before building the gravel pack. The gravel packing liquid used in this invention is prepared by suspending a weighting agent and the gravel in a base liquid which may be either an aqueous liquid or an oil-base liquid such as diesel oil, crude oil or a water-in-oil emulsion to form a gravel packing liquid. Fluid-loss reducing additives and suspending agents may be incorporated in the gravel packing liquid. Their use will depend upon the particular type of gravel packing technique that is used and the characteristics of the incompetent formation.

The weighting agents incorporated in the gravel packing liquid to increase its density are finely divided solid materials having a particle size of 50 mesh or smaller whereby the weighting agent occupies voids in the gravel pack between the particles of gravel and does not affect substantially the spacing of the gravel particles. The size of the weighting agent particles used will, therefore, be dependent on the size of gravel used in the gravel pack. If 40–60 mesh sand is used in the gravel pack, weighting agent particles should be smaller and have a size such as 200 mesh. Excessive viscosity of the gravel packing liquid will be caused if the weighting agent particles are too small, and for that reason the size of the particles should exceed two microns.

The weighting agents should have a high density to allow an increase in the density of the gravel packing liquid without an excessive volumetric concentration of solids which could make handling of the gravel packing liquid more difficult. It is essential to the weighting agent that it be removable from the gravel pack without affecting the gravel particles. The weighting agent should be soluble in a solvent which can be displaced through the gravel pack or should be capable of reacting to form soluble reaction products with a liquid that does not react with or dissolve the gravel. Preferred weighting agents for use in this invention are calcium carbonate and ferric oxide. They can be readily dissolved and removed from the gravel pack by passing hydrochloric acid through the pack.

Higher gravel packing liquid densities can be obtained with ferric oxide than with calcium carbonate. Ilmenite and other compounds which are only partially soluble in hydrochloric acid can be used if their reduction in size by the acid allows them to be readily removed from the gravel pack. The weighting agent should be substantially insoluble in the base liquid because of either the low solubility of the weighting agent or of previous saturation of the base liquid with the weighting agent. Water-soluble solids, such as sodium chloride or calcium chloride, can be suspended in a saturated brine solution to form a slurry of the desired high specific gravity and thereby used as a weighting agent, but those salts have the disadvantage of lower density and for that reason usually require high concentrations of solids to produce a gravel packing liquid of the desired high density.

The concentration of the weighting agent in the gravel packing liquid will depend on the fluid pressure of the incompetent formation and the particular weighting agent used. The concentration of weighting agent should be such that the hydrostatic pressure exerted by the gravel packing liquid exceeds the formation fluid pressure. While this invention is of value in gravel packing all overpressured formations, it is particularly valuable in gravel packing formations having a fluid pressure exceeding a column of liquid having a density of 1.2, the upper limit of specific gravity of brine solutions commonly used in well operations. Suitable chemicals capable of forming solutions having a specific gravity higher than 1.4 are not available at acceptable costs, and this invention is of still greater value when the fluid pressure in the formation corresponds to a column of liquid having a density of 1.4 or higher.

It is preferred to incorporate in the gravel packing liquid fluid-loss reducing additives that will reduce the loss of liquid into the formation during the gravel packing operation and can be removed after the gravel pack has been formed. It is preferred that the fluid-loss reducing additives be removed from the gravel pack simultaneously with the weighting agents. The finely divided solid materials used as weighting agents, such as calcium carbonate and ferric oxide are effective in reducing fluid loss into the incompetent formation and can serve as the fluid-loss material as well as the weighting agent. Fluid-loss reducing additives, such as natural gums, such as karaya or guar, can be used. Starches, gels and synthetic polymers, such as hydroxyethyl cellulose or polysaccharides, are also effective fluid-loss reducing additives that can be added to the gravel packing liquid. The subsequent passing of an aqueous solution of hydrochloric acid through the gravel pack hydrolyzes those materials to facilitate their removal from the gravel pack. The gums, starches and synthetic polymers also act as suspending agents which slow the settling of the gravel from the gravel packing liquid by increasing the viscosity of the liquid. The weighting agents also aid in suspending the gravel, particularly when the weighting agents are in high concentrations, by hindered settling of the gravel particles.

The gravel used in the gravel pack is usually a graded siliceous sand suspended in the gravel packing liquid in a concentration of ½ to 10 pounds per gallon, and more commonly in a concentration of one to five pounds per gallon. Other solid particles such as spherical glass beads can be used as "gravel" to form the gravel pack. The size of the gravel used depends upon the characteristics of the incompetent formation. The openings between the particles of gravel should be small enough to prevent substantial passage of formation sands through the gravel pack. Ordinarily formation sand particles will bridge across openings in the gravel pack, and for that reason it is not essential that the openings be smaller than the formation sand particles to prevent substantial movement of formation sands through the gravel pack. If the formation sands are coarse, such as the sands that occur in incompetent formations in California, relatively large gravel particles having a size in the range of 6 to 10 mesh in the U. S. Sieve Series can be used. It is necessary to use smaller gravel usually in the range of 20 to 40 mesh, and in some instances as small as 40 to 60 mesh, in gravel packs in wells in areas along the coast of, and offshore of, the Gulf of Mexico. Customarily a narrow range of particle sizes is used in the gravel pack. A rule of thumb that has been used is that the smallest particles have a diameter approximately one-half that of the largest particles. Some operators, however prefer to form a gravel pack with a relatively wide range of particle sizes, as is described in U.S. Pat. No. 2,905,245.

This invention is useful in any of the commonly used methods of gravel packing. For example, the methods such as those described in U. S. Pat. Nos. 3,134,439 and 2,905,245 in which a crossover tool is used to allow introduction of gravel into the annular space surrounding a slotted screen and removal of liquid through the screen can be used. This invention can also be used in gravel packing methods in which the gravel suspended in the gravel packing liquid is merely pumped down through the annulus and the liquid allowed to pass through the screen and removed through tubing. One of the commonly used methods of gravel packing is to fill the lower end of the borehole with gravel by pumping a slurry of gravel down the borehole and forcing the liquid portion of the slurry into the surrounding formation or circulating the liquid portion of the slurry back to the surface. After the borehole is filled with gravel through the interval of the incompetent formation, a screen is washed into place. In all of the methods mentioned above, the weighting agent has the effect of increasing the effective density of the gravel packing liquid and thereby increasing the hydrostatic head exerted by the liquid on the incompetent formation to reduce the possibility of formation fluids entering the well during the gravel packing operation. If these formation fluids enter the well in sufficient quantities, control of the well would be lost and a blowout would occur. In all of the methods, the finely divided weighting agent occupies the voids between the particles of gravel and has no appreciable effect on the spacing of the gravel particles so upon removal of the weighting agent the gravel pack can retain substantially its original particle spacing.

After the gravel pack has been formed, a suitable solvent is caused to pass through the gravel pack to dissolve the weighting agent and thereby open the voids in the gravel pack to increase the permeability of the gravel pack. In the preferred form of the invention in which the gravel packing liquid is a slurry of finely divided calcium carbonate or ferric oxide, hydrochloric acid acts as a suitable solvent that will remove the weighting agent from the gravel pack. Moreover, particles of weighting agent that form a filter cake against the face of the formation are dissolved by solvent. If the weighting agent is a water-soluble material such as the sodium chloride or calcium chloride mentioned as possible weighting agents when the gravel packing liquid is a saturated brine, water can be passed through the gravel pack to remove the weighting agent. If there should be a substantial amount of water in the formation fluids, solution of the weighting agent will occur when the well is placed on production.

In an example of this invention, in a well completed in a zone 10,000 feet below the surface producing excessive amounts of formation sand and having a fluid pressure of 7,500 psi, a solid-weighted liquid system is selected to control the well during gravel packing operations. An 11.8 ppg calcium chloride brine is mixed and an acid-soluble synthetic polymer viscosity-building agent and a fluid-loss agent comprising graded, finely ground calcium carbonate and lignosulfonates are added in amounts to give the liquid the viscous properties required to satisfactorily suspend ferric oxide during the gravel packing operation and to minimize the loss of the workover liquid to the formation during the packing operation. ("Viscotex," a commercial product supplied by Texas Brine Corporation of Houston, Texas, is suitable and contains both viscosity-building and fluid-loss agents.) Finely ground ferric oxide, hematite, which will pass through a 200 mesh screen, but which is essentially larger than two microns, is added to the prepared liquid until an effective liquid density of at least 14.5 ppg is obtained. Since a 10,000 foot column of 14.5 ppg liquid will exert a hydrostatic pressure slightly greater than 7,500 psi, this liquid column will control the 7,500 psi formation pressure. The well is killed by displacing the well fluid with the prepared 14.5 ppg liquid. After the well has been circulated clean, a wire wrapped screen with the required slot opening to prevent most of the formation sand from entering the well is run into the well. Attached to this liner are a cross-over tool, a packer, and other necessary conventional equipment for performing a conventional gravel packing operation. The required gravel packing sand is suspended in the 14.5 ppg fluid of this invention in a concentration of one to two pounds per gallon and the mixture pumped into the well. The packing sand screens-out on the screen and when sufficient packing sand has been placed, the cross-over tool and packer are pulled from the hole. A production packer is run into the well on a string of tubing. An inhibited and sequestered 15 percent hydrochloric acid is pumped to the end of the tubing; the packer is set and some of the special completion fluid is left between the tubing and casing as a packer fluid. Acid is then pumped into the gravel pack. A 50 percent stoichiometric excess of hydrochloric acid with respect to the hematite is used to insure that a low pH is maintained to prevent precipitation of ferric hydroxide. The acid is allowed to "soak" until it is predicted that the ferric oxide and the suspending and fluid-loss agents in the pack and on the formation face have been dissolved. The acid is produced back and the well cleaned up and put back on production.

The gravel packing method of this invention provides a safe, low cost method of forming gravel packs in overpressured formations. By increasing the density of the gravel packing suspension sufficiently that the static head exerted by the suspension exceeds the fluid pressure in the overpressured formation, the danger of blowouts is greatly reduced. The high density of the gravel packing suspension necessary to overcome the fluid pressure in the formation can be obtained with cheap, noncorrosive materials readily available in the oil fields. The small size of the weighting agent particles and the ease with which the weighting agent can be removed from the gravel pack allows design of the gravel pack independently of this invention to produce a gravel pack of optimum characteristics. The soluble, solid-particle weighting agents aid in reducing the water loss to the formation that would occur with clear liquids of comparable density. Because the weighting agent is soluble it can be removed from the gravel pack to produce a gravel pack of higher permeability than if a weighted drilling mud containing clay solids and conventional barite weighting agent were used.

We claim:

1. A method of gravel packing a well penetrating an overpressured formation comprising suspending in a base liquid solid particles of a weighting agent to form a gravel packing liquid, suspending gravel in the gravel packing liquid, displacing the suspension of gravel down the well and depositing gravel in the well in the interval of the overpressured formation to form a gravel pack, and displacing a solvent for the weighting agent into the gravel pack to remove the weighting agent therefrom, the concentration of the weighting agent in the gravel packing liquid being such that the hydrostatic head of the gravel packing liquid in the well exceeds the fluid pressure of the overpressured formation.

2. A method as set forth in claim 1 in which the size of the gravel particles is between 6 and 60 mesh and the size of the weighting agent particles is such that the weighting agent particles are substantially in the voids between the gravel particles in the gravel pack and do not substantially affect the spacing of the gravel particles.

3. A method as set forth in claim 2 in which the weighting agent is selected from the group consisting of calcium carbonate and iron oxide, and the solvent is an aqueous solution of hydrochloric acid.

4. A method as set forth in claim 3 in which the concentration of weighting agent in the base liquid results in a gravel packing liquid having a specific gravity exceeding 1.2.

5. A method as set forth in claim 3 in which the concentration of weighting agent in the base liquid results in a gravel packing liquid having a specific gravity exceeding 1.4.

6. A method as set forth in claim 2 in which a fluid-loss additive is incorporated in the gravel packing liquid.

7. A method as set forth in claim 2 in which fluid-loss additives and viscosity increasing additives are incorporated in the gravel packing liquid.

8. A method as set forth in claim 2 in which the suspension of gravel in the gravel packing liquid is delivered into the annulus surrounding a screen in the borehole in the interval of the overpressured formation and the gravel packing liquid is withdrawn through the screen.

9. A gravel packing method as set forth in claim 2 in which gravel is deposited in the borehole of the well adjacent the overpressured formation to form a gravel pack and a screen is lowered into the well on the lower end of tubing and washed into the deposited gravel.

10. A method of gravel packing a well penetrating an overpressured formation in the interval of the overpressured formation comprising displacing down the well a suspension of gravel in a gravel packing liquid, said gravel packing liquid comprising an aqueous base liquid, solid particles having a size of 2 microns to 50 mesh of a weighting agent removable by a solvent to which the gravel is substantially inert, a fluid-loss additive, and a viscosity increasing additive, the concentration of the weighting agent particles being such as to increase the specific gravity of the gravel packing liquid sufficiently above 1.2 that the pressure of a column of the gravel packing liquid in the well exceeds the fluid pressure in the formation, depositing the gravel in the well to form the gravel pack, and passing a solvent through the gravel pack to remove the weighting agent therefrom.

11. A method as set forth in claim 10 in which the weighting agent is selected from the group consisting of calcium carbonate and iron oxide and the solvent is hydrochloric acid.

* * * * *